United States Patent
Kim et al.

(10) Patent No.: US 8,900,345 B2
(45) Date of Patent: Dec. 2, 2014

(54) SEPARATION MEMBRANE, HYDROGEN SEPARATION MEMBRANE INCLUDING THE SEPARATION MEMBRANE, AND DEVICE INCLUDING THE HYDROGEN SEPARATION MEMBRANE

(71) Applicant: Samsung Electronics Co., Ltd., Suwon-si, Gyeonggi-do (KR)

(72) Inventors: Kwang Hee Kim, Seoul (KR); Hyeon Cheol Park, Hwaseong-si (KR); Byung Ki Ryu, Hwaseong-si (KR); Jae Ho Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/846,174

(22) Filed: Mar. 18, 2013

(65) Prior Publication Data

US 2013/0243660 A1    Sep. 19, 2013

(30) Foreign Application Priority Data

Mar. 19, 2012  (KR) .................. 10-2012-0027722
Mar. 15, 2013  (KR) .................. 10-2013-0028218

(51) Int. Cl.
*B01D 53/22* (2006.01)
*B01D 71/02* (2006.01)
*B01D 67/00* (2006.01)

(52) U.S. Cl.
CPC .......... *B01D 53/228* (2013.01); *B01D 2256/16* (2013.01); *B01D 67/0055* (2013.01); *Y02C 10/10* (2013.01); *B01D 71/022* (2013.01)

USPC ........... 95/56; 96/4; 96/10; 422/187; 164/495

(58) Field of Classification Search
USPC ..................... 95/55, 56; 96/4, 8, 10; 422/187; 164/495
See application file for complete search history.

(56) References Cited

U.S. PATENT DOCUMENTS

| | | | | |
|---|---|---|---|---|
| 3,713,270 | A * | 1/1973 | Farr et al. ........................ | 95/56 |
| 6,066,592 | A * | 5/2000 | Kawae et al. ................... | 95/56 |
| 6,461,408 | B2 | 10/2002 | Buxbaum | |
| 6,800,392 | B2 * | 10/2004 | Jantsch et al. ................ | 429/526 |
| 7,001,446 | B2 | 2/2006 | Roark et al. | |
| 7,468,093 | B2 | 12/2008 | Aoki et al. | |
| 2002/0058181 | A1 | 5/2002 | Jantsch et al. | |
| 2002/0062738 | A1* | 5/2002 | Yoshida et al. ................... | 96/11 |
| 2002/0157806 | A1 | 10/2002 | Nishida et al. | |

(Continued)

FOREIGN PATENT DOCUMENTS

| EP | 1566457 A1 | 8/2005 |
|---|---|---|
| JP | 2000-159503 A | 6/2000 |

(Continued)

OTHER PUBLICATIONS

Dolan, M.D., "Non-Pd BCC Alloy Membranes for Industrial Hydrogen Separation", Journal of Membrane Science, vol. 362, 2010, pp. 12-28.*

(Continued)

*Primary Examiner* — Jason M Greene
(74) *Attorney, Agent, or Firm* — Cantor Colburn LLP

(57) ABSTRACT

A separation membrane including an alloy, the alloy including at least one Group 5 element, and at least one selected from Pt and Ir.

19 Claims, 17 Drawing Sheets

(56) References Cited

U.S. PATENT DOCUMENTS

| | | |
|---|---|---|
| 2004/0129135 A1 | 7/2004 | Roark et al. |
| 2005/0217480 A1 | 10/2005 | Aoki et al. |
| 2006/0016332 A1* | 1/2006 | Ma et al. .................. 95/55 |
| 2006/0174766 A1 | 8/2006 | Buxbaum |
| 2006/0213368 A1 | 9/2006 | Kita et al. |
| 2007/0056660 A1 | 3/2007 | Aoki et al. |
| 2008/0000350 A1 | 1/2008 | Mundschau et al. |
| 2009/0056549 A1 | 3/2009 | Kita et al. |
| 2010/0092333 A1 | 4/2010 | Yamamura et al. |
| 2010/0247944 A1 | 9/2010 | Mleczko et al. |
| 2013/0136666 A1* | 5/2013 | Park et al. .................. 422/187 |
| 2013/0213228 A1 | 8/2013 | Ikeda et al. |

FOREIGN PATENT DOCUMENTS

| | | |
|---|---|---|
| JP | 2002-206135 A | 7/2002 |
| JP | 2003-001381 A | 1/2003 |
| JP | 2004-041591 A | 2/2004 |
| JP | 2004-167381 A | 6/2004 |
| JP | 2006-095521 A | 4/2006 |
| JP | 2006-283075 A | 10/2006 |
| JP | 2007-077445 A | 3/2007 |
| JP | 2009-226274 A | 10/2009 |
| JP | 2009-227487 A | 10/2009 |
| JP | 2011-072492 A | 4/2011 |
| KR | 1020110049707 A | 5/2011 |
| WO | 2008111516 A1 | 9/2008 |

OTHER PUBLICATIONS

A. G. Knapton, "Palladium Alloys for Hydrogen Diffusion Membranes", Platinum Metals Rev., vol. 21 (2), 1977, pp. 44-50.

Fukai et al., "Diffusion of hydrogen in metals", Advances in Physics, vol. 34, No. 2, 1985, pp. 263-326.

H. Wipf, "Solubility and Diffusion of Hydrogen in Pure Metals and Alloys", Physica Scripta. T94, 2001, pp. 43-51.

Hatlevik et al., "Palladium and palladium alloy membranes for hydrogen separation and production: History, fabrication strategies, and current performance", Separation and Purification Technology, vol. 73, 2010, pp. 59-64.

Kwai S. Chan, "Alloying effects on fracture mechanisms in Nb-based intermetallic in-situ composites", Materials Science and Enginneering, A329-331, 2002, pp. 513-522.

M.D. Dolan, "Non-Pd BCC Alloy membranes for industrial hydrogen separation", J. Membrane Science, vol. 362, pp. 12-28, 2010.

Nambu et al., "Enhanced hydrogen embrittlement of Pd-coated niobium metal membrane detected by in situ small punch test under hydrogen permeation", Journal of Alloys and Compounds, 446-447, 2007, pp. 588-592.

Nathan W. Ockwig et al., "Membranes for Hydrogen Separation", Chem. Rev., vol. 107, 2007, pp. 4078-4110.

S.A. Steward, "Review of Hydrogen Isotope Permeability Through Materials", Lawrence Livermore National Laboratory, Aug. 15, 1983.

Yun et al, "Correlations in palladium membranes for hydrogen separation: A review", Journal of Membrane Science, vol. 375, 2011, pp. 28-45.

\* cited by examiner

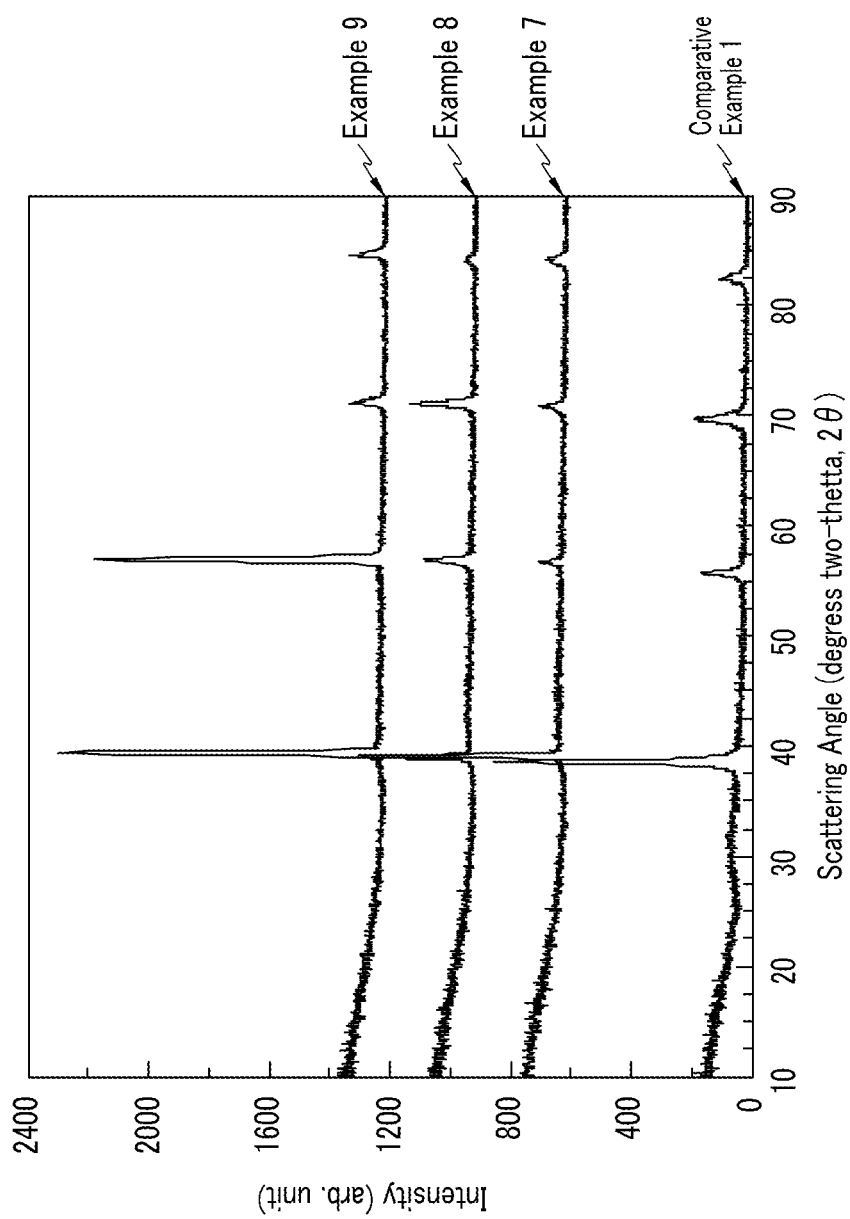

SEPARATION MEMBRANE, HYDROGEN SEPARATION MEMBRANE INCLUDING THE SEPARATION MEMBRANE, AND DEVICE INCLUDING THE HYDROGEN SEPARATION MEMBRANE

This application claims priority to Korean Patent Application No. 10-2012-0027722, filed on Mar. 19, 2012 and Korean Patent Application No. 10-2013-0028218, filed on Mar. 15, 2013, and all the benefits accruing therefrom under 35 U.S.C. §119, the contents of which in their entireties are herein incorporated by reference.

BACKGROUND

1. Field

A separation membrane, a hydrogen separation membrane including the separation membrane, and a hydrogen separation device including the hydrogen separation membrane are disclosed.

2. Description of the Related Art

Recently, hydrogen has been in the spotlight as a clean energy source. As a separation membrane for selectively separating hydrogen from hydrogen-containing gases, various metal/metal alloys, silica/zeolite ceramics, metal ceramic composites (cermet), carbon-based polymer separation membranes, and the like are known. Among them, representatively, a Pd-based alloy separation membrane is commercially used (See, for example, Ockwig, N. and Nenoff, T., Membranes for Hydrogen Separation, Chemical Reviews, 107, 4078-4110, 2007, the content of which in its entirety is herein incorporated by reference). However, in the case of a Pd-based alloy, Pd itself is a noble metal and is expensive, and hydrogen separation performance of the alloy is improved by only about 2 to 3 times. Representative Pd-based alloys include Pd—Ag23, Pd—Cu40, and the like (See, for example, Knapton, A. G., Palladium Alloys for Hydrogen Diffusion Membranes, Platinum Metals Rev., 21, 44-50, 1977, the content of which in its entirety is herein incorporated by reference).

Accordingly, there remains a need for a lower cost hydrogen separation membrane that provides excellent hydrogen permeability.

SUMMARY

An embodiment provides a separation membrane that may suppress hydrogen embrittlement fractures and has improved hydrogen permeability.

Another embodiment provides a hydrogen separation membrane including the separation membrane.

Still another embodiment provides a hydrogen separation device including the hydrogen separation membrane.

According to an embodiment, a separation membrane includes an alloy, the alloy including at least one Group 5 element, and at least one selected from Pt and Ir is provided.

The separation membrane may include a crystalline structure and have a body-centered-cubic (BCC) structure formed by the at least one Group 5 element, and the at least one selected from Pt and Ir.

The body-centered-cubic structure may have a lattice constant of about 3.2 to about 3.4 Å.

The separation membrane may include equal to or less than about 20 atom % of the at least one selected from Pt and Ir.

The separation membrane may further include at least one selected from Ti and Hf.

The separation membrane, which further include at least one selected from Ti, Zr, and Hf, may also include a crystalline structure and have a body-centered-cubic (BCC) structure formed by the at least one Group 5 element, the at least one selected from Pt and Ir, and the at least one selected from Ti, Zr, and Hf.

The body-centered-cubic structure may have a lattice constant of about 3.2 to about 3.4 Å.

The separation membrane may include equal to or less than about 70 atom % of the at least one selected from Ti and Hf.

The separation membrane may include a non-porous dense layer structure having porosity of about 1 volume % to 0 volume %, based on the total volume of the separation membrane.

The separation membrane may have a thickness of about 1 to about 1000 micrometers (μm).

In an embodiment, the at least one Group 5 element may be V, Nb, or Ta.

In an embodiment, the at least one Group 5 element may be V or Nb.

In an embodiment, the separation membrane may include a binary alloy selected from at least one of V—Pt, Nb—Pt, V—Ir, and Nb—Ir.

In an embodiment, the separation membrane may include a ternary alloy selected from at least one of V—Ti—Pt, Nb—Ti—Pt, and Nb—Ti—Ir.

The separation membrane may have an elongation rate of about 5 to about 25%, when measured by ASTM E8M standard micro-tensile test.

The separation membrane may have a maximum load of about 200 to about 600 MPa, when measured by ASTM E8M standard micro-tensile test.

According to another embodiment, a hydrogen separation membrane including the separation membrane is provided.

The hydrogen separation membrane may have hydrogen solubility (a mole ratio of H/M, wherein H denotes hydrogen atoms and M denotes metal atoms of the alloy) of about 0.05 to about 0.25, when measured at 0.1 to 1 MPa hydrogen pressure and at 300° C. to 500° C.

The hydrogen separation membrane may have hydrogen solubility (a mole ratio of H/M, wherein H denotes hydrogen atoms and M denotes metal atoms of the alloy) of about 0.1 to about 0.2, when measured at 0.7 to 1 MPa hydrogen pressure and at 400° C.

The hydrogen separation membrane may have hydrogen permeability of about $1.0 \times 10^{-8}$ to about $8.5 \times 10^{-8}$ mol/m*s*Pa$^{1/2}$ at 300° C. to 500° C.

The hydrogen separation membrane may further include a catalyst layer disposed on a side of the separation membrane.

The catalyst layer may include an alloy that includes at least one selected from Pd, Pt, Ru, and Ir, and at least one selected from Cu, Ag, Au, and Rh.

According to another embodiment, provided is a hydrogen separation device including: the hydrogen separation membrane disclosed above; an inlet chamber including an inlet for receiving a mixed gas including hydrogen gas; and a discharge chamber including an outlet for discharging a separated hydrogen gas, wherein the hydrogen separation membrane is disposed between the inlet chamber and the discharge chamber.

According to an embodiment, the hydrogen separation membrane may have a tubular shape, a cylindrical chamber barrier rib having a diameter which is greater than a diameter of the tubular hydrogen separation membrane may be disposed outside of the hydrogen separation membrane, the chamber barrier rib and the hydrogen separation membrane may define the inlet chamber, and an inner surface of the tubular hydrogen separation membrane may define the discharge chamber.

Also disclosed is a method of preparing the separation membrane disclosed above, the method including: heating at least one Group 5 element, at least one selected from Ti and Hf, and at least one selected from Pt and Ir to form an alloy; and forming a membrane from the alloy to form the separation membrane.

Also disclosed is a method of separating hydrogen, the method including: providing the hydrogen separation device disclosed above; providing a hydrogen containing gas at the inlet of the hydrogen separation device; and diffusing hydrogen through the hydrogen separation membrane of the hydrogen separation device to separate hydrogen.

BRIEF DESCRIPTION OF THE DRAWINGS

The above and other aspects, advantages and features of this disclosure will become more apparent by describing in further detail exemplary embodiments thereof with reference to the accompanying drawings, in which:

FIG. 6 is a graph of intensity (arbitrary units) versus scattering angle (degrees two-theta, 2θ) and shows the results of XRD analysis of the hydrogen separation membrane manufactured in Examples 7-9 and Comparative Example 1;

DETAILED DESCRIPTION

Figure 1:
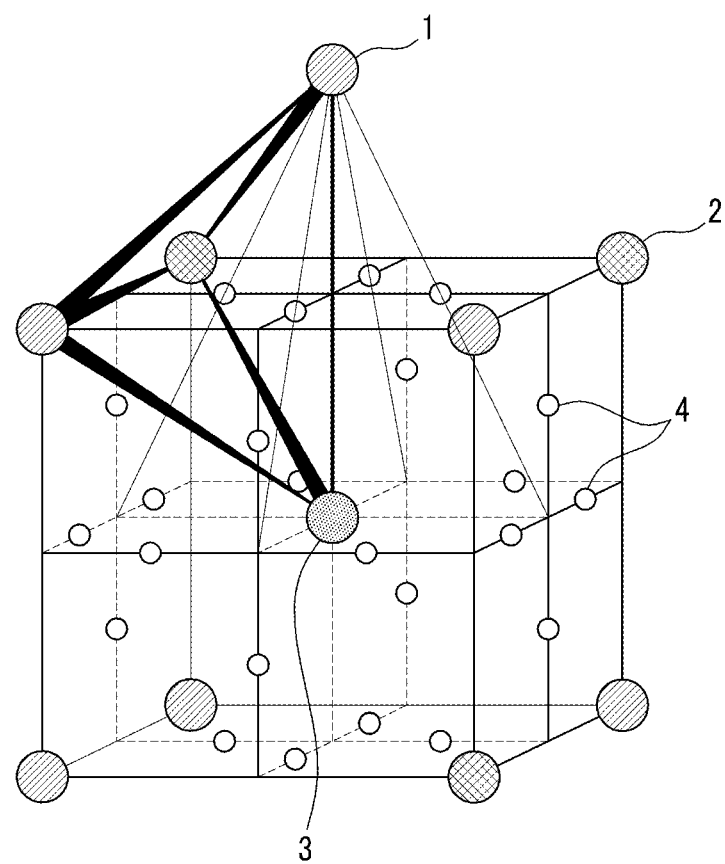
FIG. 1 schematically shows an embodiment of a crystal lattice structure of an alloy of the separation membrane.

The disclosed embodiments will be described more fully hereinafter in the following detailed description, in which some but not all embodiments of this disclosure are described. This disclosure may be embodied in many different forms and is not to be construed as limited to the embodiments set forth herein; rather, these embodiments are provided so that this disclosure thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As those skilled in the art would realize, the disclosed embodiments may be modified in various different ways, all without departing from the spirit or scope of this disclosure. The size and thickness of each constituent element as shown in the drawings are schematically illustrated for better understanding and ease of description, and this disclosure is not necessarily limited to as shown. Thus the Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an embodiment, a separation membrane comprising an alloy that comprises at least one Group 5 element, and at least one selected from Pt and Ir is provided. The separation membrane may be used to selectively separate a specific gas. When the alloy comprising the foregoing components is used to provide a separation membrane, the separation membrane may be operated at a high temperature, as compared to a temperature suitable for a polymeric separation membrane.

The at least one Group 5 element, and the at least one selected from Pt and Ir may form a crystalline alloy having a body-centered cubic structure. For example, greater than or equal to about 80 volume %, specifically about 80 to about 99.9 volume %, more specifically about 85 to about 99 volume % of the alloy may be crystalline (e.g., polycrystalline) and have the body-centered cubic structure. In an embodiment, the alloy may contain only the body-centered cubic component when analyzed by X-ray diffraction. In an embodiment, when the alloy is analyzed by X-ray diffraction, the presence of a phase other than the alloy having the body-centered cubic structure may not be observed by X-ray diffraction (XRD).

The separation membrane may further include at least one selected from Ti, Zr, and Hf.

The separation membrane, which further include at least one selected from Ti, Zr, and Hf, may also include a crystalline structure and have a body-centered-cubic (BCC) structure formed by the at least one Group 5 element, the at least one selected from Pt and Ir, and the at least one selected from Ti, Zr, and Hf.

According to another embodiment, a hydrogen separation membrane comprising the separation membrane is provided. The hydrogen separation membrane is a separation membrane that selectively separates hydrogen gas from a gas mixture comprising hydrogen gas. While not wanting to be bound by theory, it is understood that the hydrogen separation membrane has an improved hydrogen permeability because it comprises an alloy having a crystalline structure and has a body-centered cubic structure, which may easily diffuse hydrogen. As the result, the hydrogen separation membrane may provide hydrogen with a high purity. A separation membrane, in which greater than or equal to about 80 volume %, specifically about 80 to about 99.9 volume %, more specifically about 85 to about 99 volume % of the alloy is crystalline, may be useful as a hydrogen separation membrane. Also, greater than or equal to about 80 volume %, specifically about 80 to about 99.9 volume %, more specifically about 85 to about 99 volume % of the alloy may have the body-centered cubic structure.

The hydrogen separation membrane may be used to selectively permeate and separate $H_2$ gas from a gas mixture including $H_2$, $CO_2$, and CO, such as a gas which is produced by steam reforming, coal gasification, the water gas shift reaction (WGS) reaction, and the like. For example, the hydrogen separation membrane may be used to provide a high purity hydrogen generator, a hydrogen regenerator for a fuel cell, a separation membrane for separation of hydrogen from a mixed gas for a gasification combined thermal power plant, a separation membrane for $H_2/CO_2$ separation, and the like.

The separated hydrogen may be used for electric power generation by combustion of a clean energy source, such as hydrogen, or it may be used as a chemical raw material (e.g., for the synthesis of $NH_3$, an olefin, and the like) or for the purification of petroleum. Also, since a retentate gas after hydrogen removal comprises $CO_2$ at a high concentration, the $CO_2$ rich retentate gas may be selectively collected and stored for later use.

While not wanting to be bound by theory, it is understood that the hydrogen separation membrane preferentially adsorbs hydrogen gas ($H_2$), and the adsorbed hydrogen gas ($H_2$) is dissociated into hydrogen atoms (H) on the surface of the hydrogen separation membrane. Then the dissociated hydrogen atoms (H) permeate through the separation membrane. The hydrogen atoms (H) dissolve and diffuse through the tetrahedral or octahedral interstitial sites of a BCC (body-centered-cubic) unit cell of the separation membrane, thereby permeating through the membrane. (See, for example, M. D. Dolan, J. membrane science 362, 12-28 2010, the content of which in its entirety is herein incorporated by reference). The hydrogen atoms (H) which have permeated through the membrane recombine to form hydrogen gas ($H_2$), which then desorbs from the hydrogen separation membrane to provide separated hydrogen.

FIG. 1 schematically shows a crystal lattice structure of the alloy of the separation membrane, which comprises at least one Group 5 element 1, at least one selected from Ti, Zr, and Hf 2, and at least one selected from Pt and Ir 3.

As shown in FIG. 1, the foregoing components may form a crystalline alloy having a body-centered cubic structure. The body-centered cubic structure may provide a greater number of tetrahedral or octahedral interstitial sites 4, which are understood to be favorable for dissolution and/or diffusion of hydrogen atoms (H), and favorable for increased hydrogen permeability.

In the separation membrane, the at least one Group 5 element forms a body-centered cubic structure, and it is understood to maintain the body-centered cubic structure while alloying. Further, the body-cubic structure of the alloy may maintain a lattice constant similar to the lattice constant of the body-centered cubic structure of a pure Group 5 element. For example, in the separation membrane, the body-centered cubic structure of the alloy comprising at least one Group 5 element, at least one selected from Ti, Zr, and Hf, and at least one selected from Pt and Ir may have a lattice constant of about 3.2 to about 3.4 Å, which is similar to a lattice constant of pure Nb and body-centered cubic (bcc) beta-titanium.

The separation membrane may have a dense non-porous layered structure and may have a porosity of less than about 1 volume percent (volume %) to 0 volume %, specifically about 1 to about 0.0001 volume %, more specifically about 0.8 to about 0.001 volume %, based on the total volume of the separation membrane. Thus, the separation membrane may be in the form of a dense layer which is suitable to selectively permeate and separate only a material to be separated, e.g., hydrogen. If the separation membrane is used to provide a hydrogen separation membrane, it may be formed as a dense layer which can selectively pass hydrogen atoms through the metal interstitial sites and selectively separate hydrogen.

As a thickness of the separation membrane is reduced, a permeability of the material to be separated may increase. In an embodiment, the separation membrane may have a thickness of about 1 to about 1000 μm, specifically about 10 to about 500 μm, more specifically about 20 to about 200 μm, still specifically about 20 to about 30 μm, such as may be provided by a film manufacturing process.

While not wanting to be bound by theory, it is understood that because the separation membrane comprises an alloy of at least one Group 5 element, at least one selected from Pt and Ir, and optionally at least one selected from Ti, Zr, and Hf, it has increased ductility compared to a separation membrane consisting of a pure Group 5 element. As used herein, "a pure Group 5 element" is a Group 5 element which does not contain at least one selected from Pt and Ir; and at least one selected from Ti, Zr, and Hf.

If the ductility is increased to provide suitable ductility at room temperature, a film (e.g., membrane) manufacturing process comprising cold rolling the alloy may be used, and thus mass production at a lower cost may be provided. When at least one selected from Pt and Ir, and optionally at least one of Ti, Zr, and Hf are alloyed with a Group 5 element, ductility may be increased while desirably maintaining a body-centered cubic structure. Alternatively, the membrane may be manufactured by any other suitable method of forming a membrane from the alloy, such as spraying or coating the alloy.

A separation membrane consisting of a pure Group 5 element may form a metal hydride during hydrogen permeation and embrittlement may occur, a process which is referred to as "hydrogen embrittlement." Also, if external stress is applied to the embrittled part, hydrogen embrittlement fractures may be generated.

As is further explained above, the separation membrane comprises an alloy that comprises at least one selected from Pt and Ir, and optionally further comprises at least one selected from Ti, Zr, and Hf, has increased ductility, and if the ductility is increased, hydrogen embrittlement may be substantially reduced or effectively eliminated. Further, since the alloy of the at least one Group 5 element, at least one selected from Pt and Ir, and optionally at least one selected from Ti, Zr, and Hf may reduce the threshold temperature for forming a metal hydride, as compared to a pure Group 5 element, formation of the metal hydride may be suppressed under the same conditions.

While not wanting to be bound by theory, it is understood that to suppress hydrogen embrittlement fractures, hydrogen solubility should be reduced. The separation membrane may have a hydrogen solubility which is less than a hydrogen solubility of a membrane consisting of a pure Group 5 element as a result of the alloying of the Pt and/or Ir with the at least one Group 5 element. The hydrogen solubility refers to a concentration of hydrogen that may be dissolved in a metal, and is calculated as a mole ratio (H/M) of the dissolved hydrogen (H) and the metal atoms (M) of the alloy. Since Pt and Ir have a hydrogen affinity which is less than a hydrogen affinity of a Group 5 element, they may provide reduced hydrogen solubility. Although alloying a Group 5 element with Pt and/or Ir may reduce hydrogen permeability, as compared to a pure Group 5 element, the pure Group 5 element has about 10 to about 100 times the hydrogen permeability of a commercially available Pd-based hydrogen separation membrane, and thus, even if the hydrogen permeability is reduced by alloying a Group 5 element with Pt and/or Ir, sufficient hydrogen permeability for use as a hydrogen separation membrane may be provided. Thereby, a remarkable improvement in resistance to hydrogen embrittlement may be provided.

In addition, Pt and Ir may act as a catalyst for the dissociation of hydrogen gas ($H_2$) into hydrogen atoms (H) on the surface of a hydrogen separation membrane during the above-explained mechanism, whereby hydrogen gas ($H_2$) passes through a hydrogen separation membrane.

In addition, the Pt and Ir elements themselves have excellent ductility, and they may provide improved ductility when alloyed with the at least one Group 5 element. In an embodiment, the separation membrane including an alloy of V and Pt may have increased ductility of 20% or more, which allows the alloy to be processed in cold rolling to reduce the manufacturing cost.

The ductility of a separation membrane may be evaluated by the ASTM E8M standard micro-tensile test, and according to an embodiment, the separation membrane may have an elongation rate of about 5 to about 25%, specifically about 10 to about 20%, when measured by the ASTM E8M standard micro-tensile test. According to another embodiment, the separation membrane may have a maximum load of about 50 to about 600 MPa, specifically about 100 to about 500 MPa, when measured by the ASTM E8M standard micro-tensile test.

The separation membrane may be manufactured to contain the at least one selected from Pt and Ir, and optionally the at least one selected from Ti, Zr, and Hf, in an amount to provide suitable ductility, hydrogen permeability, hydrogen solubility, and the like. Specifically, the separation membrane may include about equal to or less than 20 atomic percent (atom %) of the at least one selected from Pt and Ir, based on a total content of the alloy of the separation membrane. Also, the separation membrane may include about equal to or less than 20 atomic percent (atom %) of the at least one selected from Pt and Ir, and further about equal to or less than 70 atomic percent (atom %) of the at least one selected from Ti, Zr, and Hf.

In an embodiment, the separation membrane may include about 0.1 to about 20 atom %, specifically about 0.5 to about 15 atom %, more specifically about 1 to about 10 atom % of the at least one selected from Pt and Ir; and about 80 to about 99.9 atomic percent (atom %), specifically about 85 to about 99.5 atom %, more specifically about 90 to about 99 atom % of the at least one Group 5 element, each based on a total content of the alloy of separation membrane.

In another embodiment, the separation membrane may include about 0.1 to about 20 atom %, specifically about 0.5 to about 15 atom %, more specifically about 1 to about 10 atom % of the at least one selected from Pt and Ir; about 0.1 to about 70 atom %, specifically about 1 to about 60 atom %, more specifically about 2 to about 50 atom % of the at least one selected from Ti, Zr, and Hf; and about 10 to about 99.8 atom %, specifically about 25 to about 98.5 atom %, more specifically about 40 to about 97 atom % of the at least one Group 5 element, each based on a total content of the alloy of separation membrane. The separation membrane comprising the alloy with a content ratio of the above range may have reduced hydrogen solubility while having excellent hydrogen permeability, and thus, it may be useful for a hydrogen separation membrane.

According to an embodiment, the at least one Group 5 element may be V, Nb, Ta, or a combination thereof.

According to an embodiment, the at least one Group 5 element may be V or Nb. According to another embodiment, Pt and/or Ir may be alloyed to reduce a hydrogen solubility thereof. For example, the separation membrane may include a binary alloy of "V and Pt", "Nb and Pt", "V and Ir" and "Nb and Ir". For example, the separation membrane may include a ternary alloy of V or Nb; Ti, Zr, or Hf; Pt or Ir. In an embodiment, the separation membrane may consist of an alloy selected from V—Ti—Pt, Nb—Ti—Pt, and Nb—Ti—Ir.

The separation membrane may comprise an alloy that further comprises at least one additional metal other than Ti, Zr, Hf, Pt, Ir or the Group 5 element. The at least one additional metal may comprise at least one selected from Cu, Y, Ni, Al, and Mn. If the at least one additional metal is included, the ductility of the separation membrane may be further increased.

The additional metal may also form a crystalline structure and have a body-centered cubic structure together with the Group 5 element, Ti, Zr, Hf, Pt, and Ir in the alloy. Although the alloy further comprising the additional metal may partly form an intermetallic compound, it may form a crystalline structure having a body-centered cubic structure, and thus the separation membrane comprising the alloy that further comprises the additional metal may also have a crystalline structure, wherein greater than or equal to about 80 volume %, specifically about 80 to about 99.9 volume %, more specifically about 85 to about 99 volume % of the alloy, based on a total volume of the alloy, has a body-centered cubic structure.

The separation membrane may comprise the additional metal in an amount of about 0.1 to about 30 atom %, specifically about 0.2 to about 25 atom %, more specifically about 0.4 to about 20 atom %, based on a total content of the entire alloy.

As is further described above, a hydrogen separation membrane manufactured using the separation membrane may have reduced hydrogen solubility, and specifically, a hydrogen solubility (a ratio of H/M, wherein H denotes moles of hydrogen atoms and M denotes moles of metal atoms of the alloy) of about 0.05 to about 0.25, when as measured at a hydrogen pressure of 0.1 to 1 MPa and at 300 to 500° C. More specifically, the hydrogen solubility may be about 0.1 to about 0.2, when measured under hydrogen pressure of 0.7 to 1 MPa and 400° C.

A hydrogen separation membrane manufactured using the above separation membrane has excellent hydrogen permeability. The hydrogen permeability may be calculated by the following equation.

$$\text{Permeability} = \text{solubility}(S) \times \text{diffusion coefficient}(D) \quad \text{Equation 1}$$

The separation membrane may have hydrogen permeability of about $0.1 \times 10^{-8}$ to about $9 \times 10^{-8}$ moles per meters-seconds-Pascals$^{1/2}$ (mol/m*s*Pa$^{1/2}$), specifically about $1.0 \times 10^{-8}$ to about $8.5 \times 10^{-8}$ mol/m*s*Pa$^{1/2}$, more specifically about $1.5 \times 10^{-8}$ to about $8.0 \times 10^{-8}$ mol/m*s*Pa$^{1/2}$ at about 300 to about 500° C., and specifically about $0.1 \times 10^{-8}$ to about $9.0 \times 10^{-8}$ mol/m*s*Pa$^{1/2}$, specifically about $1.5 \times 10^{-8}$ to about $8.5 \times 10^{-8}$ mol/m*s*Pa$^{1/2}$, more specifically about $1.7 \times 10^{-8}$ to about $8.0 \times 10^{-8}$ mol/m*s*Pa$^{1/2}$ at about 400° C.

The hydrogen permeability of the separation membrane may drastically increase in a membrane including a little amount of Pt, for example about 5 atom % of Pt, such as a membrane including an alloy consisted of "V and Pt (V—Pt)" or "Nb and Pt (Nb—Pt)". Specifically, a separation membrane including an alloy of V—Pt, in which the content of Pt is 5 atom %, does not crack even when the hydrogen pressure increases up to 7 bar, and exhibits hydrogen permeability ranging from about $7.8 \times 10^{-8}$ mol/m*s*Pa$^{1/2}$ to about $8.1 \times 10^{-8}$ mol/m*s*Pa$^{1/2}$. In contrast, a separation membrane manufactured from a pure Group 5 element, such as, for example, a pure V or pure Nb, cracks when the pressure increases to about 1 bar.

The separation membrane including an alloy of V—Pt or Nb—Pt may exhibit less affinity to hydrogen gas compared to the separation membrane manufactured from pure V or pure Nb. However, since the hydrogen affinity of the Group 5 element is from about 10 to about 100 times higher than the Pd based element, even though the separation membrane includes a little amount of Pt, for example equal to or less than 20 atom % of Pt, which has less hydrogen affinity than a Group 5 element, it is believed that the separation membrane may maintain enough hydrogen affinity and excellent hydrogen permeability. As shown from the Examples, however, the separation membrane including an alloy containing a little amount of Pt, for example equal to or less than 20 atom % of Pt, and at least one 5 Group element, may have drastically reduced hydrogen solubility, and thus does not crack even when a high pressure is applied, while exhibiting excellent hydrogen permeability.

The separation membrane may have a thickness of about 10 to about 1000 μm, specifically about 20 to about 200 μm. When the separation membrane has a thickness in the foregoing range, it may have a permeability suitable for use as a separation membrane. The thickness may be a thickness of the hydrogen separation membrane 23 of FIG. 3 or a thickness of the tubular hydrogen separation membrane 33 of FIG. 4.

The separation membrane may be manufactured according to known alloy manufacturing methods without limitation, the details of which can be determined by one of skill in the art without undue experimentation. For example, the separation membrane may be manufactured by uniformly combining (e.g., melting) the metals by arc melting, induction melting, spark plasma sintering, mechanical milling, and the like, and conducting a hot rolling/cold rolling process to manufacture a membrane of a desired thickness.

Figure 2:
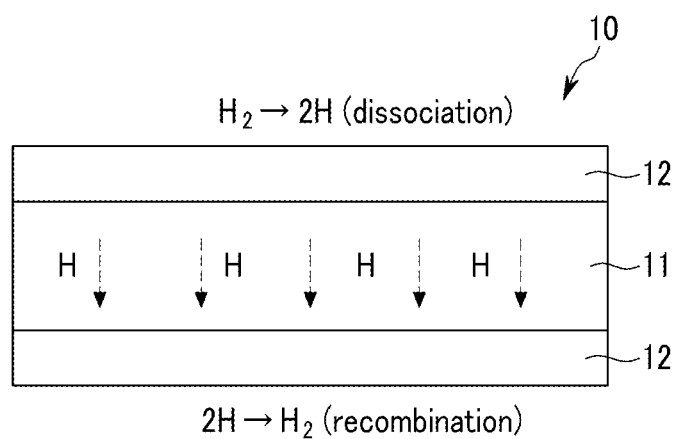
FIG. 2 schematically shows an embodiment of a mechanism in which hydrogen gas effectively passes through a hydrogen separation membrane and is separated from other gases.

The hydrogen separation membrane may further comprise a catalyst layer disposed on a side thereof. FIG. 2 shows a hydrogen separation membrane 10 wherein a catalyst layer 12 is disposed on opposite sides of a separation membrane 11, and schematically shows a mechanism by which hydrogen gas ($H_2$) passes through the hydrogen separation membrane. As is further described above, since permeation of hydrogen through the hydrogen separation membrane 10 is provided by hydrogen atoms, dissociation of hydrogen molecules ($H_2$) into hydrogen atoms (H) is understood to occur before hydrogen permeates through the membrane. The catalyst layer 12 may function as a catalyst for aiding in the dissociation of hydrogen molecules. The hydrogen that passes through the hydrogen separation membrane 10 and is selectively permeated recombines to form hydrogen molecules, and the rate of recombination may be accelerated by the catalyst layer 12.

The catalyst layer 12 may comprise a material that may function as a catalyst for the dissociation of the hydrogen molecules or for the recombination of hydrogen to form hydrogen molecules on the surface of the hydrogen separation membrane 10 without limitation. In an embodiment, the catalyst layer 12 may comprise at least one selected from Pd, Pt, Ru, and Ir, and optionally at least one selected from Cu, Ag, Au, and Rh.

The catalyst layer 12 may have a thickness of about 50 to about 1000 nanometers (nm), specifically about 200 to about 500 nm. When the catalyst layer 12 has a thickness in the above range, it may suitably function as a catalyst without significantly inhibiting permeability of the entire hydrogen separation membrane 10.

According to yet another embodiment, a hydrogen separation device is provided, which comprises an inlet chamber equipped with an inlet for supply of a mixed gas which includes hydrogen gas, a discharge chamber including an outlet for separated hydrogen gas, and a hydrogen separation membrane.

The hydrogen separation membrane is positioned between the inlet chamber and the discharge chamber, and may contact the inlet chamber on a first surface of the hydrogen separation membrane, and contact the discharge chamber on an opposite second surface of the hydrogen separation membrane.

Figure 3:
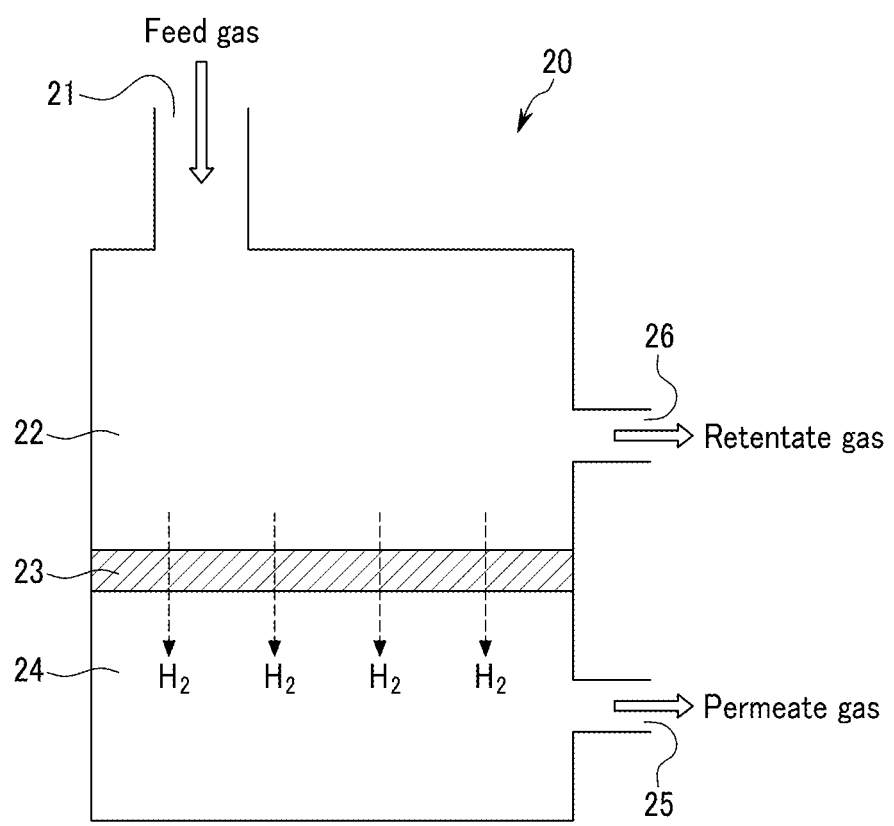
FIG. 3 is a schematic view showing an embodiment of a hydrogen separation device.

FIG. 3 is a schematic view showing an embodiment of a hydrogen separation device 20. If a mixed gas including hydrogen gas is introduced into an inlet chamber 22 through an inlet 21, hydrogen gas is selectively separated and disposed in a discharge chamber 24 through the hydrogen separation membrane 23. The separated hydrogen gas may be recovered through an outlet 25. The hydrogen separation device 20 may further comprise a recovery unit 26 to recover a residual gas in the inlet chamber 22 after hydrogen is separated from the inlet chamber 22. The hydrogen separation device 20 is shown in a simplified form for better comprehension and ease of description, and it may further include additional components according to use.

Figure 4:
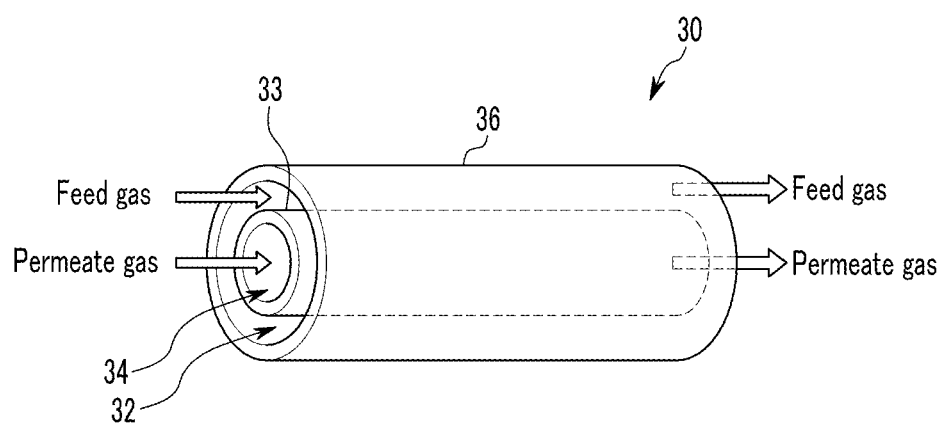
FIG. 4 is a schematic view showing another embodiment of a hydrogen separation device.

FIG. 4 is a schematic view showing another embodiment wherein the hydrogen separation device 30 has a tubular shape. According to an embodiment, the hydrogen separation device 30 may comprise a tubular hydrogen separation membrane 33, and a cylindrical barrier chamber 36 having a larger diameter than a diameter of the tubular hydrogen separation membrane. The cylindrical barrier chamber 36 is disposed outside of the hydrogen separation membrane 33. In an embodiment, a space between and defined by the cylindrical barrier chamber 36 and the hydrogen separation membrane may be an inlet chamber 32, and the inside of the tubular hydrogen separation membrane may be a discharge chamber 34 for discharging hydrogen. The inlet chamber 32 may be equipped with an inlet for supply of a mixed gas including hydrogen gas (not shown) and a recovery unit for recovering residual gas (not shown) after hydrogen gas is separated from the inlet chamber 32. Further, the discharge chamber 34 may be equipped with an outlet for the separated hydrogen gas (not shown).

According to yet another embodiment, a hydrogen separation device comprising a tubular hydrogen separation membrane 33 may be formed such that a mixed gas may be supplied inside the tubular hydrogen separation membrane 33, and hydrogen may pass through the tubular hydrogen separation membrane 33 and be separated so as to be disposed outside of the hydrogen separation membrane 33 to discharge hydrogen, contrary to the embodiment of FIG. 4. That is, the inside of the hydrogen separation membrane 33 may be an inlet chamber where mixed gas is supplied, and the outside of the hydrogen separation membrane 33 may be a discharge chamber where hydrogen is discharged.

Hereinafter, an embodiment is illustrated in more detail with reference to examples. However, the following are exemplary embodiments and are not limiting.

EXAMPLES

Example 1

Nb, Ti, and Pt are uniformly melted by arc melting to make an alloy to manufacture a hydrogen separation membrane comprising a separation membrane with a thickness of 50 μm. Specifically, Nb at 55 atomic percent (atom %), Ti at 40 atom %, and Pt at 5 atom %, each based on a total content of the Nb, Ti, and Pt, are weighed to prepare a mixture, the arc melter evacuated to $5 \times 10^{-5}$ Torr or less, and Ar added to provide an oxidation-preventing atmosphere. Then, electrical current is increased to melt the mixture to provide a product, and then the product is cooled to provide a solidified product. To manufacture a membrane with a desired thickness, the solidified product is hot rolled/cold rolled and annealed to manufacture a separation membrane, and then Pd is coated on both sides of the membrane to a thickness of 200 nm to manufacture a hydrogen separation membrane.

Example 2

A hydrogen separation membrane is manufactured by the same method as Example 1, except for arc melting a mixture prepared by weighing Nb at 35 atom %, Ti at 60 atom %, and Pt at 5 atom %, each based on a total content of the Nb, Ti, and Pt.

Example 3

A hydrogen separation membrane is manufactured by the same method as Example 1, except for arc melting a mixture prepared by weighing Nb at 32.5 atom %, Ti at 60 atom %, and Pt at 7.5 atom %, each based on a total content of the Nb, Ti, and Pt.

Example 4

A hydrogen separation membrane is manufactured by the same method as Example 1, except for arc melting a mixture prepared by weighing Nb at 55 atom %, Ti at 40 atom %, and Ir at 5 atom %, each based on a total content of the Nb, Ti, and Ir.

Example 5

A hydrogen separation membrane is manufactured by the same method as Example 1, except for arc melting a mixture prepared by weighing Nb at 52.5 atom %, Ti at 40 atom %, and Ir at 7.5 atom %, each based on a total content of the Nb, Ti, and Ir.

Example 6

A hydrogen separation membrane is manufactured by the same method as Example 1, except for arc melting a mixture prepared by weighing Nb at 37.5 atom %, Ti at 60 atom %, and Ir at 2.5 atom %, each based on a total content of the Nb, Ti, and Ir.

Example 7

A hydrogen separation membrane is manufactured by the same method as Example 1, except for arc melting a mixture prepared by weighing Nb at 35 atom %, Ti at 60 atom %, and Ir at 5 atom %, each based on a total content of the Nb, Ti, and Ir.

Example 8

A hydrogen separation membrane is manufactured by the same method as Example 1, except for arc melting a mixture prepared by weighing Nb at 32.5 atom %, Ti at 60 atom %, and Ir at 7.5 atom %, each based on a total content of the Nb, Ti, and Ir.

Example 9

A hydrogen separation membrane is manufactured by the same method as Example 1, except for arc melting a mixture prepared by weighing Nb at 30 atom %, Ti at 60 atom %, and Ir at 10 atom %, each based on a total content of the Nb, Ti, and Ir.

Example 10

A hydrogen separation membrane is manufactured by the same method as Example 1, except for arc melting a mixture prepared by weighing Nb at 95 atom %, and Pt at 5 atom %, each based on a total content of the Nb, and Pt.

Example 11

A hydrogen separation membrane is manufactured by the same method as Example 1, except for arc melting a mixture prepared by weighing Nb at 92.5 atom %, and Pt at 7.5 atom %, each based on a total content of the Nb, and Pt.

Example 12

A hydrogen separation membrane is manufactured by the same method as Example 1, except for arc melting a mixture prepared by weighing V at 97.5 atom %, and Pt at 2.5 atom %, each based on a total content of the V, and Pt.

Example 13

A hydrogen separation membrane is manufactured by the same method as Example 1, except for arc melting a mixture prepared by weighing V at 97 atom %, and Pt at 3 atom %, each based on a total content of the V, and Pt.

Example 14

A hydrogen separation membrane is manufactured by the same method as Example 1, except for arc melting a mixture prepared by weighing V at 95 atom %, and Pt at 5 atom %, each based on a total content of the V, and Pt.

Example 15

A hydrogen separation membrane is manufactured by the same method as Example 1, except for arc melting a mixture prepared by weighing V at 94 atom %, and Pt at 6 atom %, each based on a total content of the V, and Pt.

Example 16

A hydrogen separation membrane is manufactured by the same method as Example 1, except for arc melting a mixture prepared by weighing V at 92.5 atom %, and Pt at 7.5 atom %, each based on a total content of the V, and Pt.

Comparative Example 1

A hydrogen separation membrane consisting of pure Nb with a thickness of 50 μm is manufactured.

Comparative Example 2

A hydrogen separation membrane consisting of pure V with a thickness of 50 μm is manufactured.

Comparative Examples 3 to 7

Hydrogen separation membranes are manufactured by the same method as Example 1, except for arc melting a mixture prepared by weighing V at 95 atom %, along with each 5 atom % of Ni (Comparative Example 3), 5 atom % of Cr (Comparative Example 4), 5 atom % of Mo (Comparative Example 5), 5 atom % of W (Comparative Example 6), and 5 atom % of Ti (Comparative Example 7), respectively, based on a total content of the V, and each of Ni, Cr, Mo, W, or Ti.

Comparative Example 8

A hydrogen separation membrane is manufactured by the same method as Example 1, except for arc melting a mixture prepared by weighing Nb at 90 atom % and Pt at 10 atom %, each based on a total content of Nb and Pt.

Comparative Example 9

A hydrogen separation membrane is manufactured by the same method as Example 1, except for arc melting a mixture prepared by weighing Nb at 60 atom % and Ti at 40 atom %, each based on a total content of Nb and Ti.

Experimental Example 1

Crystal Structure Analysis

For the hydrogen separation membranes manufactured in Example 4, Example 5, Example 7, Example 8, Example 9, and Comparative Example 1, X-ray diffraction analysis (XRD) is conducted to determine if a body-centered cubic structure is present.

Figure 5A:
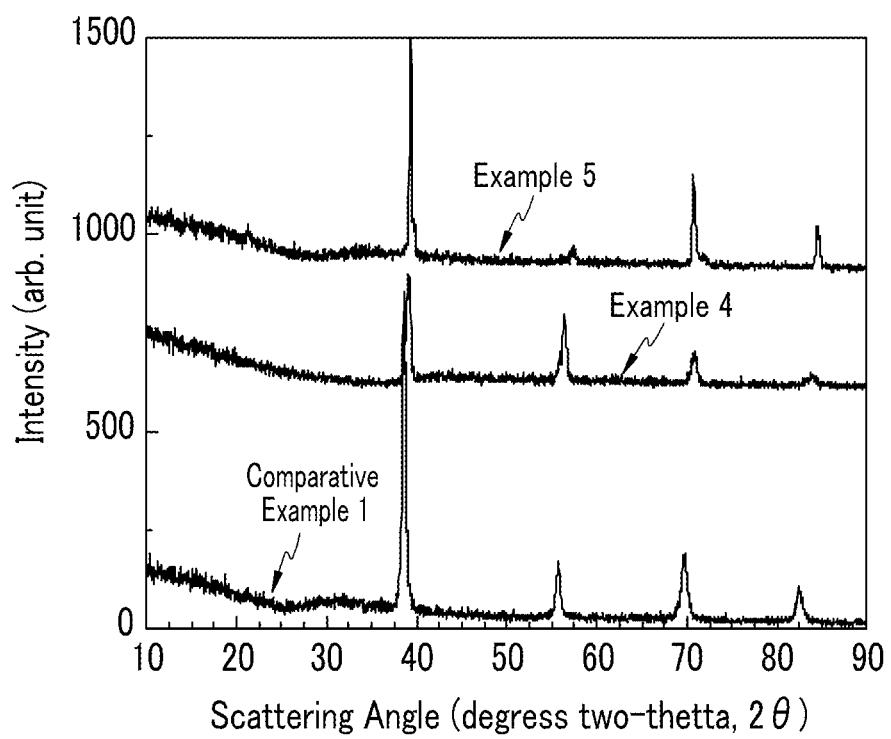
FIG. 5A is a graph of intensity (arbitrary units) versus scattering angle (degrees two-theta, 2θ) and shows the results of XRD analysis of the hydrogen separation membranes manufactured in Examples 4 and 5 and Comparative Example 1.
Figure 5B:
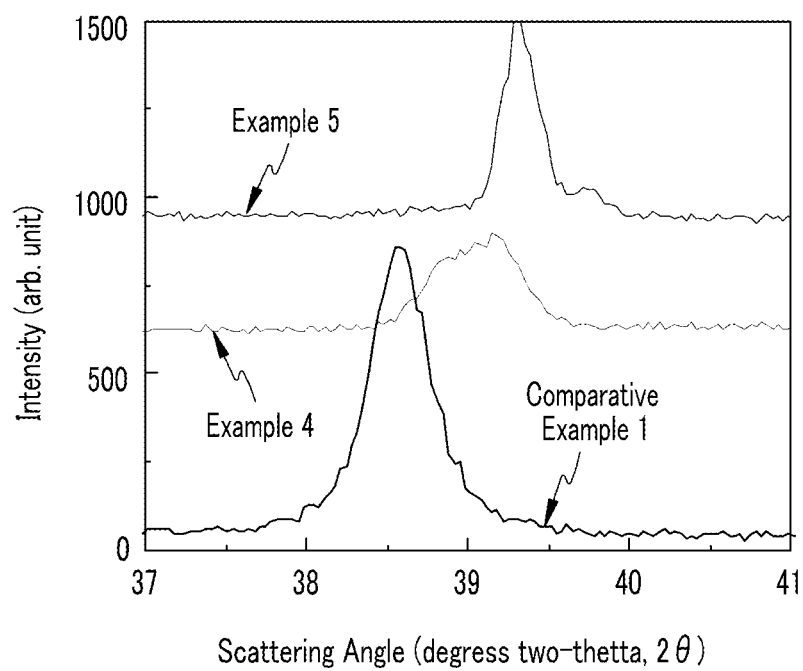
FIG. 5B is a graph of intensity (arbitrary units) versus scattering angle (degrees two-theta, 2θ) and is an expanded view of the portion of FIG. 5A between 37 and 41 degrees 2θ.

FIG. 5A shows the results of XRD analysis of the hydrogen separation membranes manufactured in Example 4, Example 5, and Comparative Example 1. FIG. 5B is an enlarged view of the peaks between 37 and 41 degrees 2θ. From the XRD results of FIGS. 5A and 5B, it is confirmed that Example 4 and Example 5 have the body-centered cubic structure.

FIG. 6 shows the results of XRD analysis of the hydrogen separation membranes manufactured in Example 7, Example 8, Example 9, and Comparative Example 1. From the XRD results of FIG. 6, it is confirmed that Example 7, Example 8, and Example 9 have the body-centered cubic structure.

It is also shown by comparison of FIGS. 5A, 5B, and 6 that Examples 7-9, which included 60 atom % Ti, contain a greater fraction of the body-centered cubic structure than Examples 4 and 5, which included 40 atomic % Ti. While not wanting to be bound by theory, it is understood that the increased content of the body-centered cubic structure of Examples 7-9 is because the content of Ti is greater in Examples 7-9 than in Examples 4-5.

Further, for the hydrogen separation membranes manufactured in Example 12, Example 14, and Example 16, and Comparative Example 2, X-ray diffraction analysis (XRD) is conducted to determine if a body-centered cubic structure is present.

Figure 7:
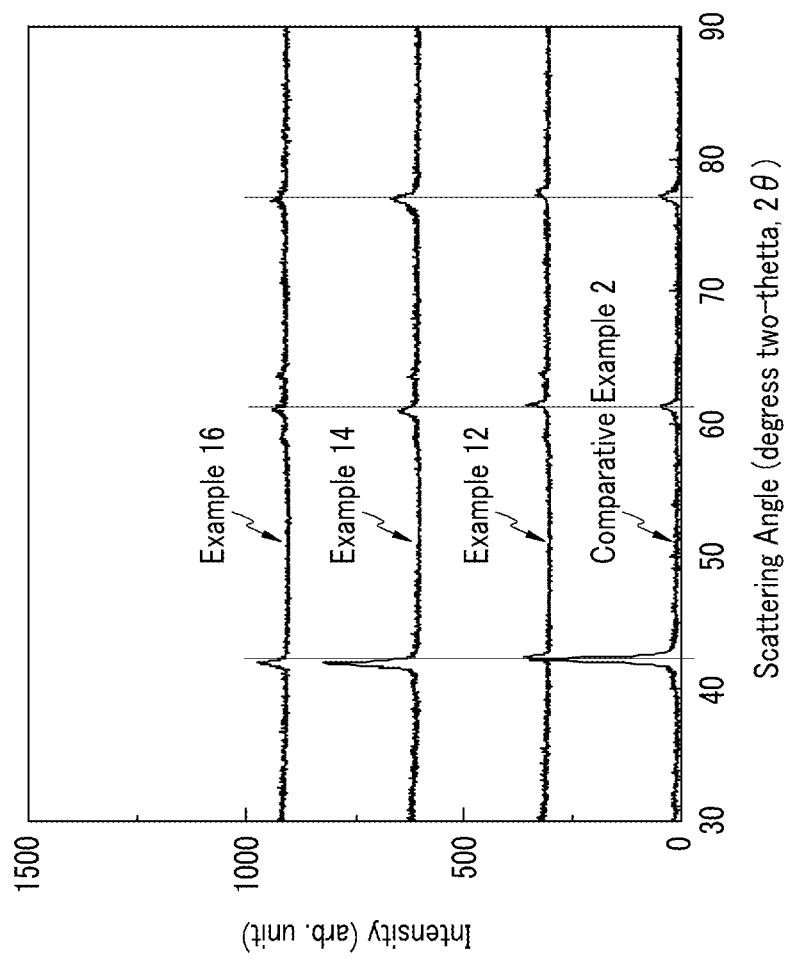
FIG. 7 is a graph of intensity (arbitrary units) versus scattering angle (degrees two-theta, 2θ) and shows the results of XRD analysis of the hydrogen separation membrane manufactured in Examples 12, 14, and 16, and Comparative Example 2.

FIG. 7 shows the results of XRD analysis of the hydrogen separation membranes manufactured in Examples 12, 14, and 16, and Comparative Example 2. From the XRD results of FIG. 7, it is confirmed that Examples 12, 14, and 16 have the body-centered cubic structure, as well as Comparative Example 2.

Experimental Example 2

Evaluation of Formation of Metal Hydride

For the hydrogen separation membranes manufactured in Example 6, Example 8, and Comparative Example 1, after hydrogen dissolution by contacting the membranes with about 2 MPa (about 20 bar) of hydrogen, they are cooled to room temperature (about 25° C.), and X-ray diffraction analysis (XRD) is conducted to determine if a metal hydride is formed by determining whether or not a peak corresponding to a metal hydride is present.

Figure 8:
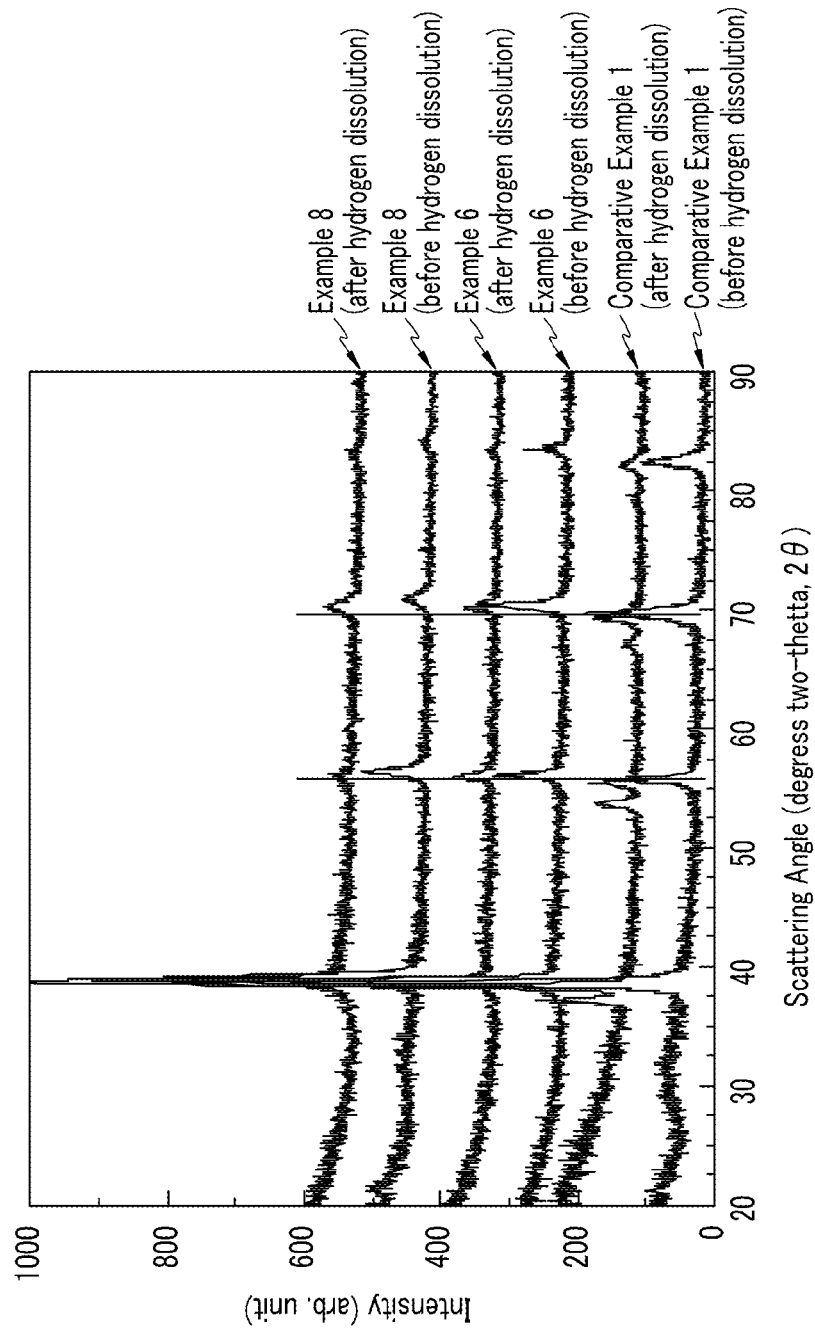
FIG. 8 is a graph of intensity (arbitrary units) versus scattering angle (degrees two-theta, 2θ) and shows the results of XRD analysis of the hydrogen separation membrane manufactured in Examples 6 and 8 and Comparative Example 1.

FIG. 8 shows the results of XRD analysis of the hydrogen separation membranes manufactured in Example 6, Example 8, and Comparative Example 1. It is confirmed that in Comparative Example 1, a metal hydride that did not exist before hydrogen dissolution is generated by the contacting with hydrogen, whereas the metal hydride is not present in Example 6 and Example 8.

Experimental Example 3

Ductility Evaluation

Micro-Tensile Test

The ductility of the hydrogen separation membranes manufactured in Examples 6 to 8 and Comparative Example 1 is evaluated by the ASTM E8M standard micro-tensile test. According to the standard, each hydrogen separation membrane manufactured in Examples 6 to 8 and Comparative Example 1 is pulled at 300° C. to obtain a graph of stress (pulling strength, megaPascals (MPa)) versus strain (percent, %) of the hydrogen separation membrane.

Figure 9:
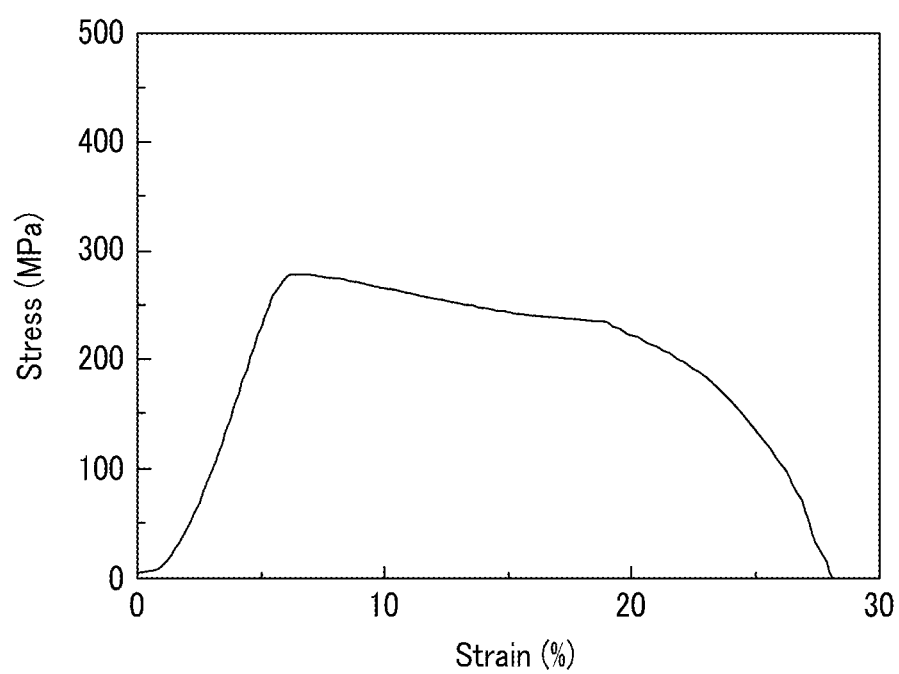
FIG. 9 is a graph of stress (megaPascals, MPa) versus strain (percent, %) for the hydrogen separation membrane manufactured in Comparative Example 1.

FIG. 9 is a stress-strain graph of Comparative Example 1.

Figure 10:
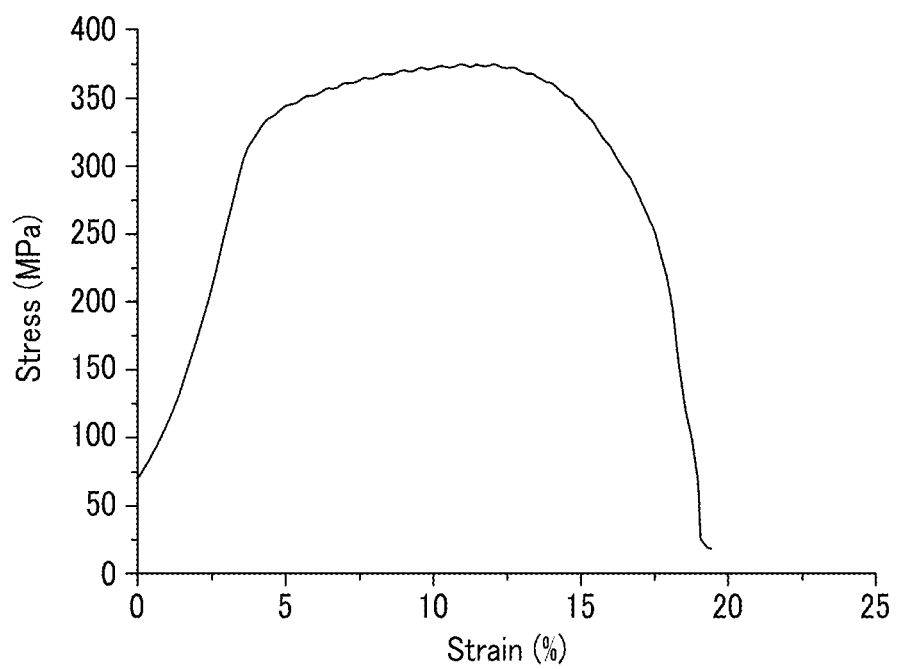
FIG. 10 is a graph of stress (megaPascals, MPa) versus strain (percent, %) for the hydrogen separation membrane manufactured in Example 6.

FIG. 10 is a stress-strain graph of Example 6 showing the results of the micro-tensile test for Example 6. The hydrogen separation membrane of Example 6 exhibits an elongation rate of about 18% and a maximum load of 350 MPa, which is an improvement of about 50 MPa when compared to the 300 MPa maximum load of Comparative Example 1.

Figure 11:
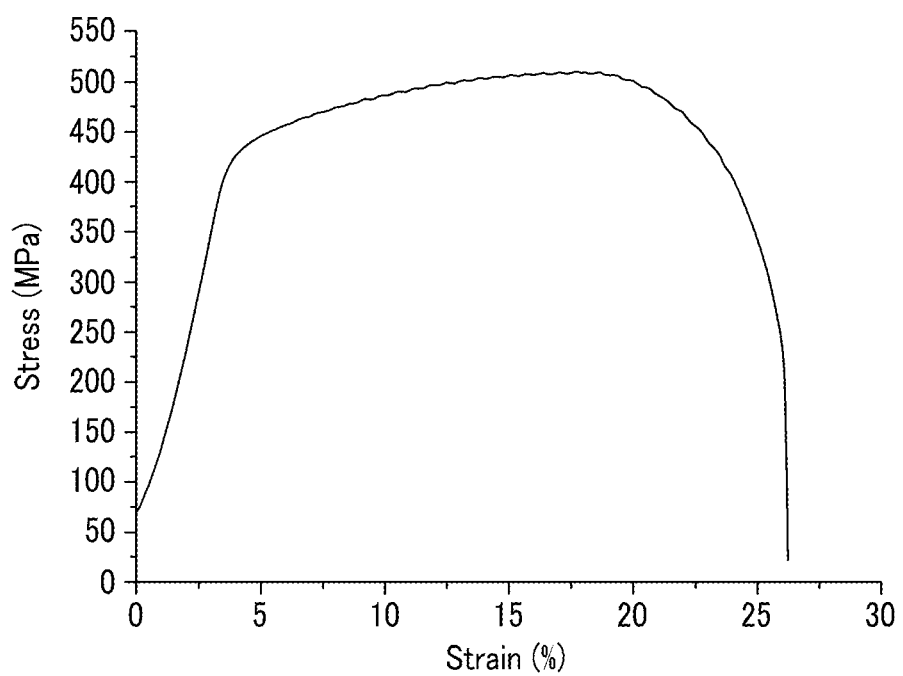
FIG. 11 is a graph of stress (megaPascals, MPa) versus strain (percent, %) for the hydrogen separation membrane manufactured in Example 7.

FIG. 11 is a stress-strain graph of Example 7 showing the results of the micro-tensile test for Example 7. The hydrogen separation membrane of Example 7 exhibits an elongation rate of about 20 to 25% and a maximum load of 500 MPa, which is an improvement of about 200 MPa when compared to the 300 MPa maximum load of Comparative Example 1.

Figure 12:
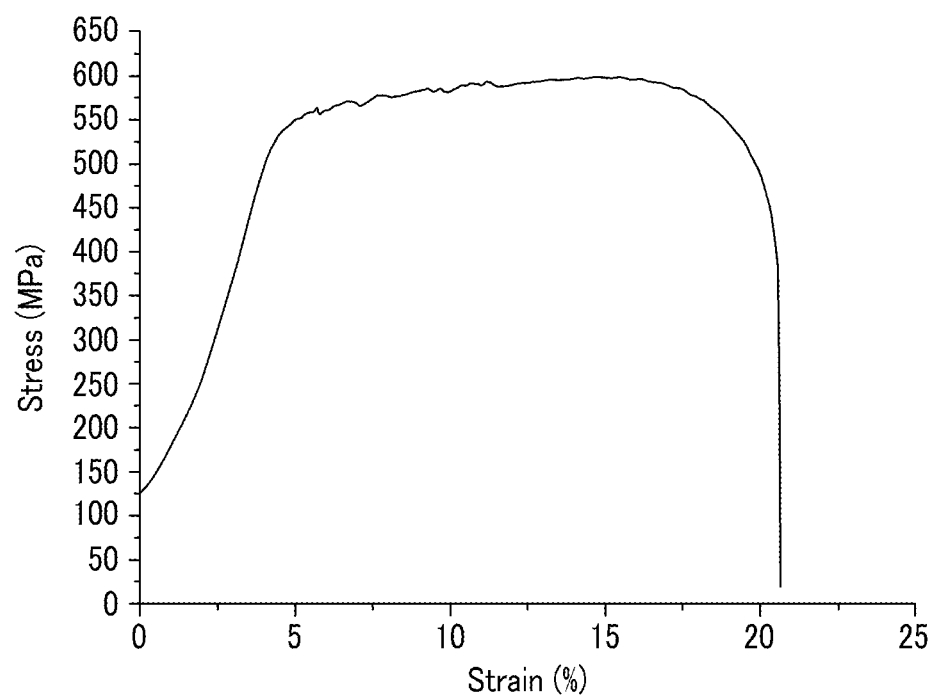
FIG. 12 is a graph of stress (megaPascals, MPa) versus strain (percent, %) for the hydrogen separation membrane manufactured in Example 8.

FIG. 12 is a stress-strain graph of Example 8 showing the results of the micro-tensile test for Example 8. The hydrogen separation membrane of Example 8 exhibits an elongation rate of about 18 to 21% and a maximum load of 600 MPa, which is an improvement of 200 percent when compared to the 300 MPa maximum load of Comparative Example 1.

Figure 13:
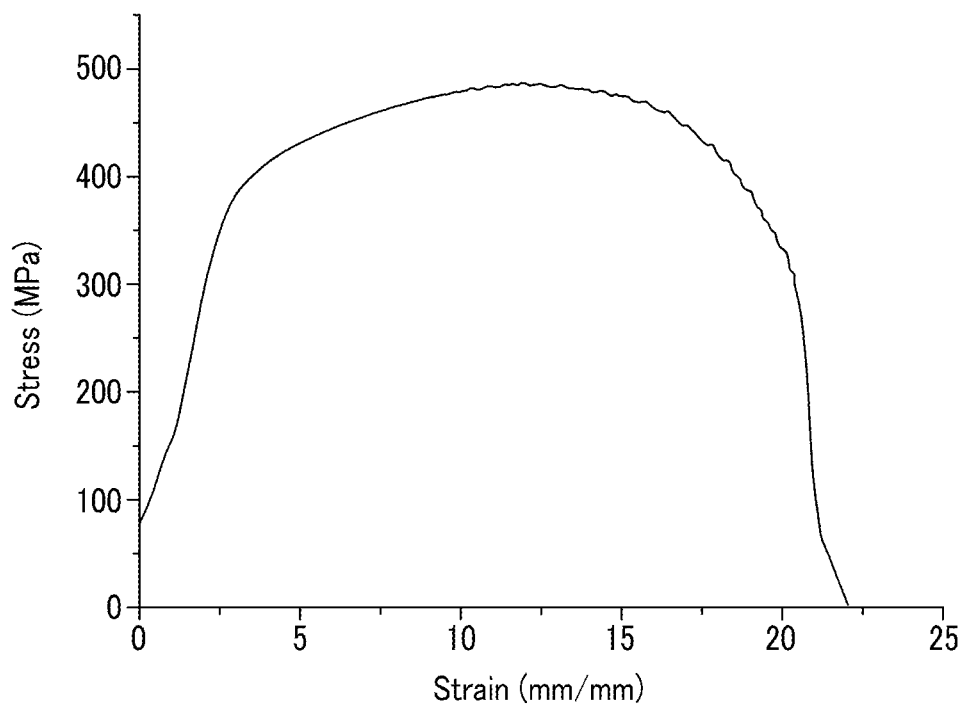
FIG. 13 is a graph of stress (megaPascals, MPa) versus strain (percent, %) for the hydrogen separation membrane manufactured in Example 14.

FIG. 13 is a stress-strain graph of Example 14 showing the results of the micro-tensile test for Example 14. The hydrogen separation membrane of Example 14 exhibits an elongation rate of more than about 20% and a maximum load of 600 MPa, which is an improvement of 200 percent when compared to the 300 MPa maximum load of Comparative Example 1.

Cutting Test

The hydrogen separation membranes manufactured in Examples 1 to 3, and 10, and Comparative Example 8 are melted with an arc melter and cut, and the cutting characteristics are evaluated according to the following evaluation standards. If ductility is good, the hydrogen separation membrane is sufficiently pressed without being cut when it is contacted with a cutter.

The evaluation standards are as follows.
B: Smoothly cut into 2 pieces when contacted with a cutter
B/D: Slightly pressed and cut into 2 pieces.
D: Pressed to the end without being cut.
The results are disclosed in Table 1.

TABLE 1

|  | Ex 1 | Ex 2 | Ex 3 | Ex 10 | CEx 8 |
|---|---|---|---|---|---|
| Cutting evaluation | D | D | D | B/D | B |

In Table 1, Ex refers to Example and CEx refers to Comparative Example.

As is shown in Table 1, Examples 1 to 3 have excellent ductility and Example 10 has moderate ductility. All of the Examples exhibit better ductility than Comparative Example 8.

Experimental Example 4

Evaluation of Hydrogen Solubility

Figure 14:
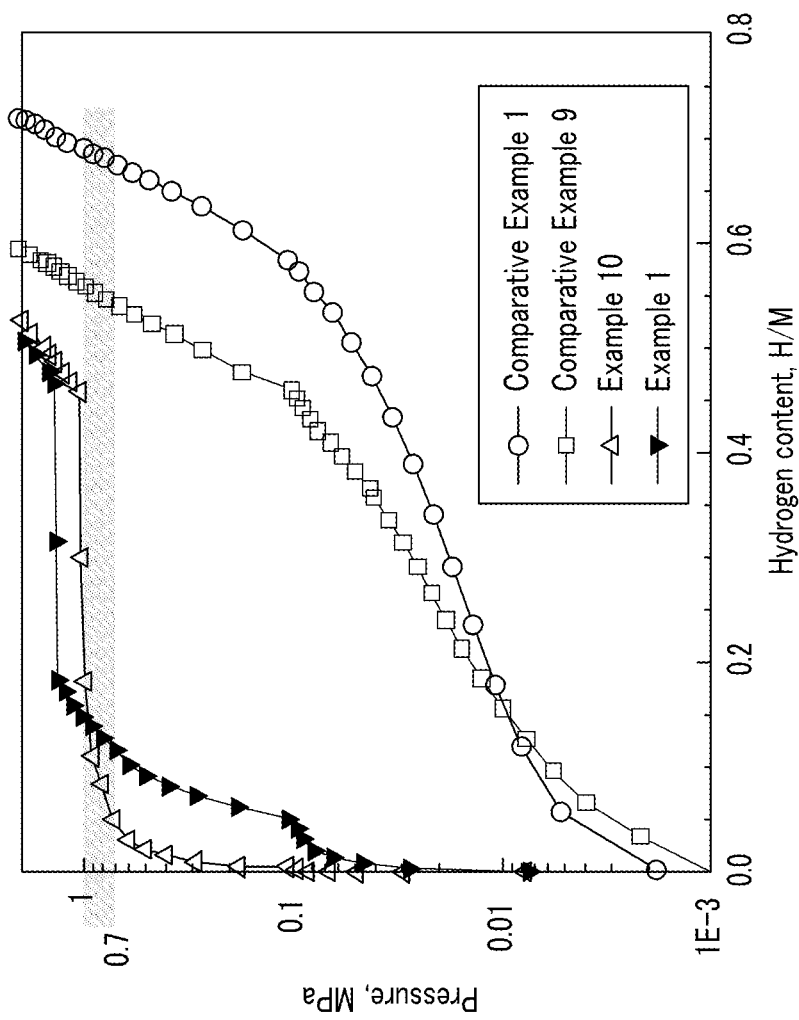
FIG. 14 is graph of pressure (megaPascals, MPa) versus hydrogen content (hydrogen to metal ratio, H/M) and is a pressure-concentration-temperature (PCT) graph of the hydrogen separation membranes manufactured in Examples 1 and 10, and Comparative Examples 1, and 9.

For the hydrogen separation membranes manufactured in Example 1, Example 10, Comparative Example 1, and Comparative Examples 9, hydrogen solubility is measured according to hydrogen pressures at 400° C. according to the JIS H7201 standard, and to evaluate hydrogen solubility, PCT (pressure-concentration-temperature) evaluation is performed. The results are shown in FIG. 14.

It is confirmed that in Example 1 and Example 10, hydrogen solubility is significantly decreased as compared to Comparative Examples 1, and 9.

The simulated (300° C. condition) result of hydrogen permeability of the separation membrane manufactured in Example 1 is $2.0 \times 10^{-8}$ mol/m*s*Pa$^{1/2}$.

Meanwhile, in order to compare hydrogen solubility of the alloys including V and Pt, or V and another element, for the hydrogen separation membranes manufactured in Example 14 and Comparative Examples 3 to 7, hydrogen solubility is measured according to hydrogen pressures at 400° C., according to the JIS H7201 standard, and PCT (pressure-concentration-temperature) evaluation is performed. The results are shown in FIG. 15.

Figure 15:
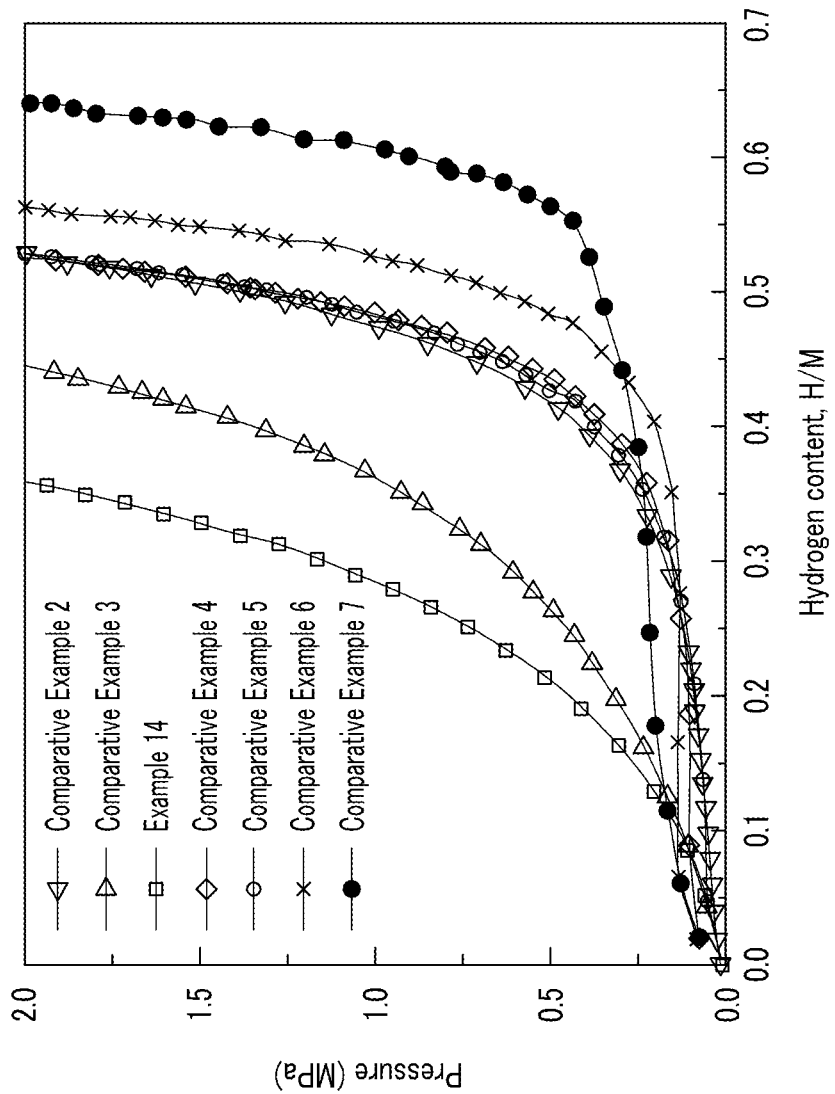
FIG. 15 is graph of pressure (megaPascals, MPa) versus hydrogen content (hydrogen to metal ratio, H/M) and is a pressure-concentration-temperature (PCT) graph of the hydrogen separation membranes manufactured in Example 14, and Comparative Examples 3 to 7.

As is shown from FIG. 15, it is confirmed that in Example 14, hydrogen solubility has significantly reduced compared to those of Comparative Examples 3 to 7.

Further, in order to compare hydrogen solubility depending on the contents of the Pt element, for the hydrogen separation membranes manufactured in Examples 13 and 15, and Comparative Examples 1 and 2, hydrogen solubility is measured according to hydrogen pressures at 400° C., according to the JIS H7201 standard, and PCT (pressure-concentration-temperature) evaluation is performed. The results are shown in FIG. 16.

Figure 16:
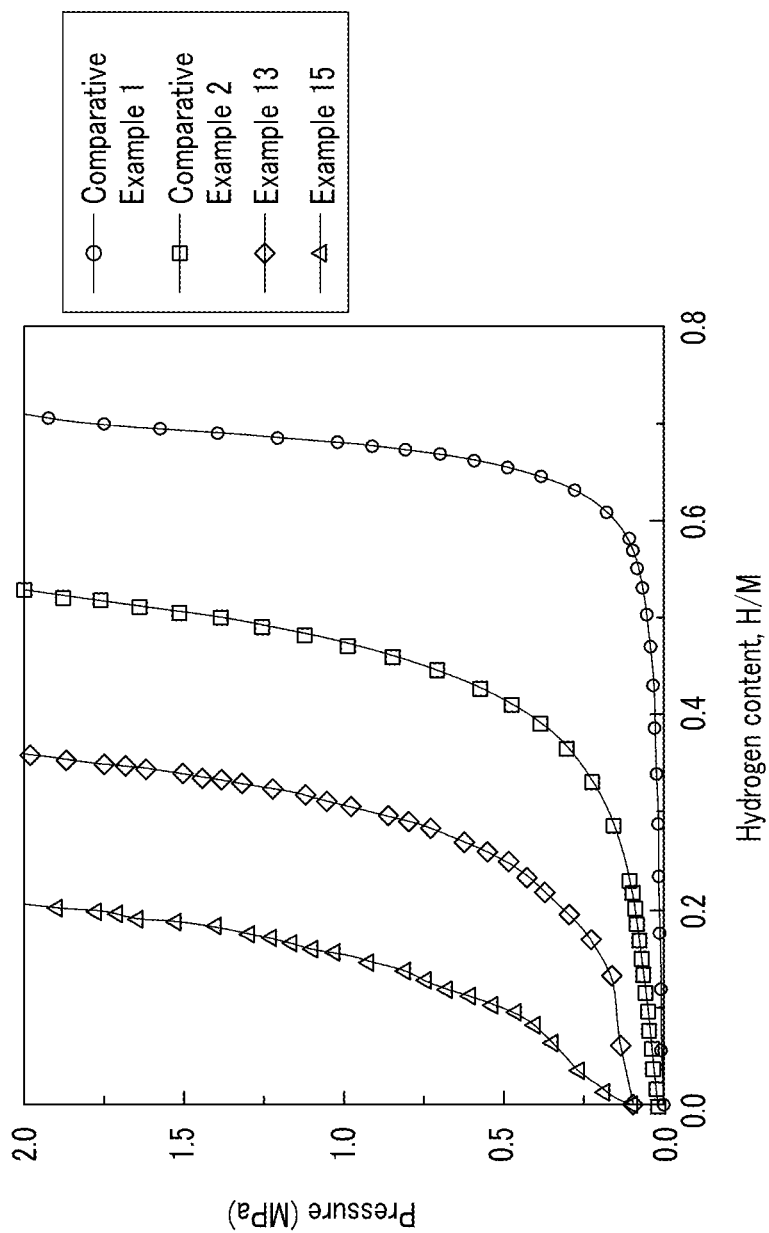
FIG. 16 is graph of pressure (megaPascals, MPa) versus hydrogen content (hydrogen to metal ratio, H/M) and is a pressure-concentration-temperature (PCT) graph of the hydrogen separation membranes manufactured in Examples 13 and 15, and Comparative Examples 1, and 2.

As is shown from FIG. 16, it is confirmed that in the hydrogen membrane including 6 atom % of Pt according to Example 15, hydrogen solubility (H/M) has significantly reduced to about 0.18 at 7 bar of hydrogen pressure. In the hydrogen membrane including 3 atom % of Pt according to Example 13, hydrogen solubility (H/M) is as low as about 0.25 at 7 bar of hydrogen pressure. In contrast, in the hydrogen membrane manufactured from pure Nb (Comparative Example 1) and pure V (Comparative Example 2), hydrogen solubility (H/M) has increased to about 0.65 and to about 0.43, respectively, at 7 bar of hydrogen pressure, and is very high compared to the hydrogen membrane including an alloy containing V and Pt.

Experimental Example 5

Evaluation of Hydrogen Permeability

From the results of Experimental Example 4, it is confirmed that alloying a Group 5 element with at least one of Pt and Ir may reduce hydrogen solubility of the pure Group 5 element. Without wanting to be bound to a specific theory, it is believed that this is because the hydrogen affinity of Pt or Ir is lower than that of a Group 5 element, thus hydrogen solubility of the alloy has decreased. As hydrogen solubility has decreased in the alloys, the hydrogen membranes including the alloys have increased resistance to hydrogen embrittleness fracture, as is shown from the results of the ductility evaluation according to Experimental Example 3.

Further, effect of decrease in hydrogen solubility of the hydrogen membrane has been studied in relation with hydrogen permeability of the membrane. Particularly, upon measuring hydrogen permeability of the hydrogen membrane manufactured in Example 15 by varying hydrogen gas pressure from 1 bar to 7 bar, the hydrogen membrane does not crack and exhibits excellent hydrogen permeability of as high as about $8.1 \times 10^{-8}$ mol/m*s*Pa$^{1/2}$. In contrast, the hydrogen membranes manufactured in Comparative Examples 1 and 2 crack due to hydrogen embrittleness even when the hydrogen gas pressure is increased to about 1 bar, thus cannot be measured for hydrogen permeability. The results are shown in Table 2 below.

TABLE 2

| | Hydrogen Solubility | Hydrogen Permeability ($\times 10^{-8}$ mol/m*s*Pa$^{1/2}$) | | | |
|---|---|---|---|---|---|
| | (H/M) | 1 bar | 3 bar | 5 bar | 7 bar |
| EX 14 | 0.22 | 8.0 | 7.8 | 7.9 | 8.1 |
| CEx 1 | 0.6~0.8 | | Crack | | |
| CEx 2 | 0.6~0.8 | | Crack | | |

In Table 2, Ex refers to Example and CEx refers to Comparative Example.

As is shown in Table 2, although Pt or Ir decreases hydrogen solubility of a Group 5 element due to lower hydrogen affinity of Pt or Ir, since a Group 5 element has high hydrogen permeability, the alloy including a Group 5 element and Pt or Ir has not been deteriorated in hydrogen permeability, rather exhibits excellent hydrogen permeability, even when the hydrogen solubility has drastically reduced. Specifically, as is shown from FIGS. 14 to 16, the hydrogen membranes including an alloy containing a Group 5 element and Pt do not crack due to the very low hydrogen solubility and exhibit very high hydrogen permeability, even when the hydrogen pressure is highly increased.

Therefore, it is confirmed that the separation membrane including an alloy containing at least one Group 5 element, and at least one of Pt and Ir, according to an embodiment of the invention, may usefully be applied to a hydrogen membrane due to its high resistance to hydrogen embrittleness, as well as high hydrogen permeability.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A separation membrane comprising an alloy, the alloy comprising:
   at least one Group 5 element;
   at least one selected from Ti, Zr, and Hf; and
   at least one selected from Pt and Ir,
   wherein the at least one Group 5 element is present in an amount of about 10 atomic percent to 59.9 atomic percent,
   wherein the at least one selected from Ti, Zr, and Hf is present in an amount of about 40 to about 70 atomic percent, and
   wherein the at least one selected from Pt and Ir is present in an amount of about 0.1 to about 20 atomic percent, each based on a total content of the alloy of the separation membrane.

2. The separation membrane of claim 1, wherein the alloy comprises a crystalline alloy having a body-centered cubic structure formed by the at least one Group 5element, the at least one selected from Ti, Zr, and Hf, and the at least one selected from Pt and Ir.

3. The separation membrane of claim 2, wherein a lattice constant of the crystalline alloy is about 3.2 to about 3.4 angstroms.

4. The separation membrane of claim 1, wherein the separation membrane has a porosity of less than about 1 volume percent to 0 volume %, based on the total volume of the separation membrane.

5. The separation membrane of claim 1, wherein the separation membrane has a thickness of about 1 to about 1000 micrometers.

6. The separation membrane of claim 1, wherein the at least one Group 5 element is Nb.

7. The separation membrane of claim 1, wherein the separation membrane has an elongation rate of about 5 to about 25 percent, when measured by the ASTM E8M standard microtensile test.

8. The separation membrane of claim 1, wherein the separation membrane has a maximum load of about 50 to about 600 megaPascals, when measured by the ASTM E8M standard micro-tensile test.

9. A hydrogen separation membrane comprising the separation membrane of claim 1.

10. The hydrogen separation membrane of claim 9, wherein the hydrogen separation membrane has a hydrogen solubility of about 0.05 to about 0.25, wherein the hydrogen solubility is a ratio of moles of hydrogen atoms to moles of a metal atoms of the alloy and is measured at 0.1 to 1 megaPascals hydrogen pressure and at 300° C. to 500° C.

11. The hydrogen separation membrane of claim 9, wherein the hydrogen separation membrane has a hydrogen solubility of about 0.1 to about 0.2, wherein the hydrogen solubility is a mole ratio of hydrogen atoms to metal atoms of the alloy and is measured at 0.7 to 1 megaPascal hydrogen pressure and at 400° C.

12. The hydrogen separation membrane of claim 9, wherein the hydrogen separation membrane has a hydrogen permeability of about $1.0 \times 10^{-8}$ to about $9.0 \times 10^{-8}$ mol/m*s*Pa$^{1/2}$ at 300° C. to 500° C.

13. The hydrogen separation membrane of claim 9, further comprising a catalyst layer disposed on a side of the separation membrane.

14. The hydrogen separation membrane of claim 13, wherein the catalyst layer comprises an alloy comprising at least one selected from Pd, Pt, Ru, and Ir, and at least one selected from Cu, Ag, Au, and Rh.

15. A hydrogen separation device comprising:
the hydrogen separation membrane according to claim 9;
an inlet chamber comprising an inlet for receiving a mixed gas comprising hydrogen gas; and
a discharge chamber comprising an outlet for discharging a separated hydrogen gas,
wherein the hydrogen separation membrane is disposed between the inlet chamber and the discharge chamber.

16. The hydrogen separation device of claim 15, wherein the hydrogen separation membrane has a tubular shape,
a cylindrical chamber barrier rib having a diameter greater than a diameter of the tubular hydrogen separation membrane is disposed outside of the hydrogen separation membrane,
the chamber barrier rib and the hydrogen separation membrane define the inlet chamber, and
an inner surface of the tubular hydrogen separation membrane defines the discharge chamber.

17. A method of preparing the separation membrane of claim 1, the method comprising:
heating at least one Group 5 element, at least one selected from Ti and Hf, and at least one selected from Pt and Ir to form an alloy; and
forming a membrane from the alloy to form the separation membrane.

18. The method of claim 17, wherein the heating comprises are melting and the forming comprises rolling.

19. A method of separating hydrogen, the method comprising:
providing a hydrogen separation device according to claim 15;
providing a hydrogen containing gas at the inlet of the hydrogen separation device; and
diffusing hydrogen through the hydrogen separation membrane of the hydrogen separation device to separate hydrogen.

* * * * *